United States Patent
Benakli et al.

(10) Patent No.: US 7,161,755 B1
(45) Date of Patent: Jan. 9, 2007

(54) INCREASING AREAL DENSITY IN MAGNETIC RECORDING MEDIA

(75) Inventors: Mourad Benakli, Shrewsbury, MA (US); Michael Mallary, Sterling, MA (US); Adam F. Torabi, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 288 days.

(21) Appl. No.: 10/408,650

(22) Filed: Apr. 7, 2003

Related U.S. Application Data

(60) Provisional application No. 60/371,236, filed on Apr. 8, 2002.

(51) Int. Cl.
*G11B 5/02* (2006.01)

(52) U.S. Cl. .................................................. 360/55
(58) Field of Classification Search ............... 428/694; 360/55, 48, 67, 68; 327/107, 108
See application file for complete search history.

(56) References Cited

U.S. PATENT DOCUMENTS

| | | | | |
|---|---|---|---|---|
| 4,656,546 A | * | 4/1987 | Mallory | 360/110 |
| 4,778,719 A | * | 10/1988 | Jagannathan | 428/694 BA |
| 5,398,227 A | * | 3/1995 | Miyaoka et al. | 369/116 |
| 5,985,436 A | * | 11/1999 | Hirokane et al. | 369/13.53 |
| 5,986,977 A | * | 11/1999 | Birukawa et al. | 369/13.06 |
| 5,995,341 A | * | 11/1999 | Tanaka et al. | 360/122 |
| 6,061,307 A | * | 5/2000 | Shimazaki et al. | 369/13.1 |
| 6,345,016 B1 | * | 2/2002 | Shiratori | 369/13.54 |
| 6,359,744 B1 | * | 3/2002 | Mallary | 360/40 |
| 6,477,118 B1 | * | 11/2002 | Awano et al. | 369/13.14 |
| 6,483,784 B1 | * | 11/2002 | Nakatani et al. | 369/13.38 |
| 6,498,696 B1 | * | 12/2002 | Salo et al. | 360/53 |
| 6,671,116 B1 | * | 12/2003 | Akagi et al. | 360/55 |
| 6,689,496 B1 | * | 2/2004 | Komura et al. | 428/694 TS |
| 2003/0017364 A1 | * | 1/2003 | Kikitsu et al. | 428/693 |

OTHER PUBLICATIONS

NN8607592 by IBM Tech Disc Bulletin from Jul. 1986.*

Lijie Guan and Jian-Gang Zhu, "Effect of Fast Head Field Rise Time In Perpendicular Recording," IEEE Transactions On Magnetics, vol. 38, No. 5, Sep. 2002, pp. 2024-2026.

L. He, W. D. Doyle and H. Fujiwara, "High Speed Coherent Switching Below the Stoner-Wohlfarth Limit," IEEE Transactions On Magnetics, vol. 30, No. 6, Nov. 1994, pp. 4086-4088.

Mourad Benakli, Adam F. Torabi, Michael L. Mallary, Hong Zhou, and H. Neal Bertram, "Micromagnetic Study of Switching Speed in Perpendicular Recording Media," IEEE Transactions on Magnetics, vol. 37, No. 4, Jul. 2001, pp. 1564-1566.

Ganping Ju, R. J. M. Van De Veerdonk, E. B. Svedberg, K. W. Wierman, D. Weller, K. J. Howard, M. H. Kryder, S. Tamaru, J. T. Wolfson, and J. A. Bain, "Sub-Nanosecond Non-Arrhenium Magnetic Switching in Perpendicular Multilayers," IEEE Transactions On Magnetics, vol. 37, No. 4, Jul. 2001, pp. 1570-1572.

(Continued)

*Primary Examiner*—Wayne Young
*Assistant Examiner*—Glenda P. Rodriguez
(74) *Attorney, Agent, or Firm*—Cesari and McKenna, LLP

(57) ABSTRACT

A magnetic recording medium is made of a thin film medium that includes magnetic grains. At least one of a magnetization density of the magnetic grains, a crystalline anisotropy field of the magnetic grains, a thickness of the recording medium, an average diameter of the magnetic grains, and a surface packing fraction of the recording medium are selected so that resulting magneto-static fields both decrease thermal switching of individual magnetic grains and enhance collective switching of a group of magnetic grains in response to a switching magnetic field.

37 Claims, 5 Drawing Sheets

OTHER PUBLICATIONS

Phan Le Kim and Cock Lodder, "Time-Dependence Effect in Atumite Recording Media with Perpendicular Anisotropy," IEICE Trans. Electron, vol. E82-C, No. 12, Dec. 1999, pp. 2176-2183.

H. Neal Bertram, Xiaobin Wang, and Vladimir L. Safonov, "Dynamic-Thermal Effects in Thin Film Media," IEEE Transactions On Magnetics, vol. 317, No. 4, Jul. 2001, pp. 1521-1527.

* cited by examiner

INCREASING AREAL DENSITY IN MAGNETIC RECORDING MEDIA

CROSS-REFERENCE TO RELATED APPLICATION

This application claims priority to U.S. Provisional Application No. 60/371,236, filed on Apr. 8, 2002, the contents of which are hereby incorporated by reference into this application as if set forth herein in full.

TECHNICAL FIELD

This application relates to a way of increasing the areal density of a magnetic recording medium.

BACKGROUND

A magnetic disk drive is a digital data storage device that stores digital data on a magnetic recording medium known as a disk. A disk, in general, contains tracks for storing the digital data. The tracks are defined by a servo pattern recorded in the magnetic layer, which itself is comprised of individual magnetic grains. Data is stored on the tracks of the disk as magnetic polarity transitions induced in these magnetic grains.

Increases in areal density of magnetic disks have been achieved through the use of smaller magnetic grains. The superparamagnetic effect, however, limits growth in areal density. That is, the smaller the grains become, the less thermally stable they become until, at some point, the grains are no longer stable at room temperature. This instability compromises the integrity of data on a disk.

SUMMARY

In general, in one aspect, the invention is directed to a magnetic recording system that includes a recording medium having a packing fraction of less than 64% and a write head which applies a magnetic field to the recording medium. The magnetic field switches at a rate of 0.15 ns or less. Advantageously, this configuration allows for an increase in areal density of the recording medium without sacrificing stability. This aspect of the invention may include one or more of the following features.

The recording medium may be a perpendicular recording medium or a longitudinal recording medium and may include a soft underlayer. The recording medium may include magnetic grains having a substantially elongated shape. A ratio of a thickness of the recording medium to a diameter of individual magnetic grains may be greater than one. The recording medium may include at least one of cobalt and platinum and/or may have a high magnetization density.

The write head may apply the magnetic field at an angle relative to the recording medium. The angle may be 10° or more relative to a normal to the recording medium. A self-magnetization field of magnetic grains in the recording medium may be at least 75% of an anisotropy field of the grains. The packing fraction may less than 60%. The packing fraction may be less than 50%, a saturation magnetization of magnetic grains in the recording medium may be about 700 emu/cc, a crystalline anisotropy field strength of the recording medium may be about 7 kOe, and/or an average ratio of a thickness of the recording medium to a diameter of the magnetic grains may be about 4.

In general, in another aspect, the invention is directed to a magnetic recording system, which includes a recording medium comprised of magnetic grains and a read/write magnetic head which provides a magnetic field to switch the magnetic grains collectively. The magnetic recording medium has a packing fraction of less than one. This aspect may include one or more of the following.

The packing fraction of less than one may impede individual thermal switching of the grains. The recording medium may be a perpendicular or longitudinal recording medium, the recording medium may include a soft underlayer, and/or the magnetic grains may have a substantially elongated shape. A ratio of a thickness of the recording medium to a diameter of individual magnetic grains may be greater than one. The packing fraction may be less than 60%. The write head may apply the magnetic field at an angle relative to the recording medium. The angle may be 10° or more relative to a normal to the recording medium.

A self-magnetization field of magnetic grains in the recording medium may be at least 75% of an anisotropy field of the grains. The recording medium may include at least one of cobalt and platinum and/or have a high magnetization density. The system may include a head positioning circuit which positions the read/write magnetic head relative to the magnetic recording medium. The read/write magnetic head may include a shielded pole recording head.

In general, in another aspect, the invention is directed to a magnetic recording medium made of a thin film medium that includes magnetic grains. At least one of a magnetization density of the magnetic grains, a crystalline anisotropy field of the magnetic grains, a thickness of the recording medium, an average diameter of the magnetic grains, and a surface packing fraction of the recording medium are selected so that resulting magneto-static fields both decrease thermal switching of individual magnetic grains and enhance collective switching of a group of magnetic grains in response to a switching magnetic field.

Other features and advantages of the invention will become apparent from the following description, including the claims and drawings.

DESCRIPTION OF THE DRAWINGS

Like reference numerals in different figures indicate like elements.

DESCRIPTION

Figure 1:
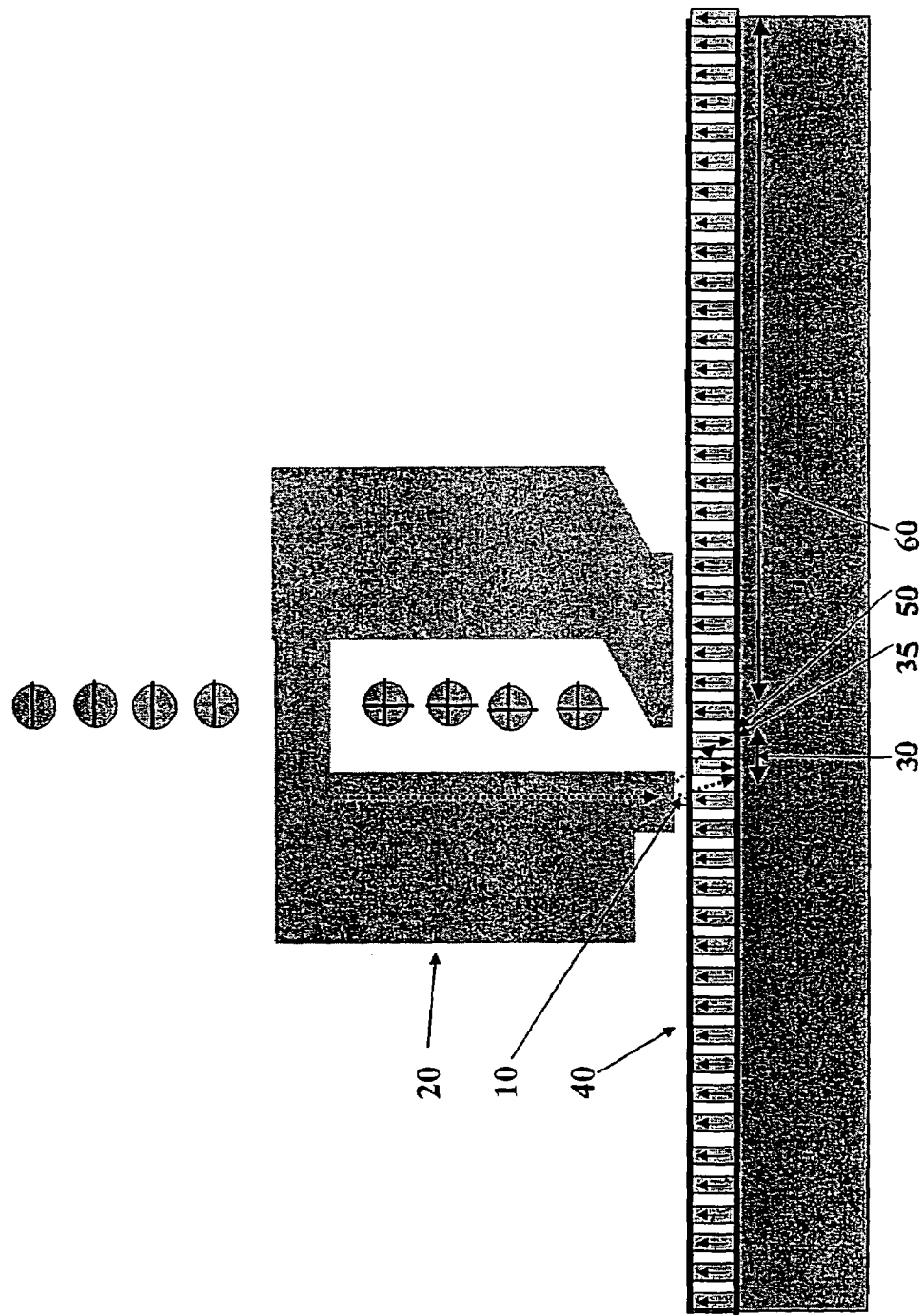
FIG. 1 is a side view of a shielded pole magnetic write head and a granular magnetic recording medium.

Perpendicular recording systems record bits in a direction that is perpendicular to the plane of a magnetic recording medium having perpendicular magnetizing anisotropy. Adjacent bits are magnetized in the anti-parallel direction. The magnetic moments of adjacent bits stabilize each other, which allows an increase in coercive force and therefore contributes to high-density recording.

Increases in the areal density of data (e.g., bits) recorded on a recording medium are inhibited by thermal switching (decay) of magnetic grains in the medium. In order to reduce the area of each recorded bit without reducing the signal-to-noise ratio (SNR) during data read-back, and thus the reliability of data recovery, the area of each magnetic grain may be reduced. There also may be corresponding decreases in data track width and bit spacing (i.e., the distance between bits on the medium).

In order to maintain the integrity of the write process, the thickness of the medium and, thus the height of each grain, is reduced by the same scaling factor that is applied to reduce the track width and the bit spacing. As a result, the volume of the magnetic grains may be reduced faster than the area devoted to each bit.

The energy barrier (Eb) to magnetic grain thermal switching is directly proportional to a volume of the grain. As a result, Eb decreases as the data areal density increases. The critical threshold for Eb, in order to sustain data over a period greater than ten years, is forty times the average thermal energy of the magnetism in the grains. This value is 40 kT, where k is Boltzman's constant and T is the absolute temperature in degrees Kelvin (K).

The energy barrier, Eb, to switching an isolated spherical grain is also proportional to the product of its magnetization per unit volume and its crystalline (anisotropy) switching field, commonly denoted as Ms and Hk, respectively. Crystalline anisotropy is a measure of the energy necessary to deflect the magnetic moment of a single grain from an "easy" to a "hard" direction. The easy and hard directions arise from the interaction of the grain's spin magnetic moment with a crystal lattice.

By increasing the magnetic switching field for the grains, the energy barrier Eb per unit volume can be increased and, thus, the volume of a thermally-stable grain can be decreased. As a result, the surface area of the recording medium that is dedicated to a thermally stable bit, with adequate SNR, can be decreased, resulting in an increase in areal density for the medium.

A limitation on the foregoing is that the crystalline switching field cannot be increased beyond the writeability limits of the magnetic recording head materials. Similarly, there are constraints on the magnetization per unit volume (Ms). If the magnetization axes of the grains are perpendicular to the surface of the recording medium, as is the case in perpendicular recording media, excessive Ms will produce a large demagnetization field (Hd), which results from collective magnetization of all of the magnetic grains on the medium.

The demagnetization field Hd will reduce the energy barrier (Eb) below the critical value needed for thermal stability. These constraints of writeability, thermal stability, and adequate SNR have limited the areal density that can be achieved with magnetic recording media.

The magnetic recording system described herein increases areal density by controlling the dimensions (e.g., the diameter and height) of recording medium grains, their anisotropy field, their magnetization density, switching field direction, and switching field time dependence. The system includes a perpendicular magnetic recording head which generates a substantially longitudinal field, in addition to a perpendicular field, and a granular magnetic recording medium with perpendicular magnetic anisotropy and (optionally) a magnetically soft underlayer (SUL). In one embodiment, the magnetic recording medium may include a thick soft magnetic film having a high permeability and a perpendicular recording layer having a high perpendicular anisotropy, separated by a spacer layer.

An example of a magnetic recording head that may be used is described in U.S. Pat. No. 4,656,546, the contents of which are hereby incorporated by reference into this application as if set forth herein in full.

The magnetic recording medium isolates its magnetic grains from each other using a non-magnetic ("dead") region (made from non-magnetic material) in order to achieve a controlled surface packing fraction. "Packing fraction", as is known in the art, refers to the square of the ratio between grain diameter (Dg) and grain center-to-center distance (Dcc), i.e., $(Dg/Dcc)^2$. The magnetization density of the grains, their crystalline anisotropy field, the media thickness, average diameter of the grains, and the surface packing fraction of the medium are selected so that resulting magneto-static fields both inhibit thermal switching of individual grains and enhance collective switching of a group of grains in response to a rapidly switching write field produced by the recording head.

In order for the magneto-static fields to inhibit thermal switching of individual grains, the ratio of media thickness to grain diameter should be significantly greater than unity (one), the magnetization density should be large, and the packing fraction should be significantly less than unity (e.g., the packing fraction should be less than 64%). This increase in magnetization density and decrease in area packing should be inversely proportional in order to produce a magnetic charge density that is compatible with commercially-available disk drives.

In order for the magneto-static fields to enhance the ability of the write field to switch grains in the recording medium, the packing fraction should not be too low (e.g., the ratio of grain diameter to media thickness may be larger than ⅙), the magnetization density of the grains should be large (e.g., the self-magnetization field of the grains may be equal to or greater than 75% of the anisotropy field of the grains), the write field should be at a predetermined angle (e.g., >7°) relative to a normal to the medium, and the switching rise time of the write head magnetic field should be substantially less than the gyromagnetic precession period of the magnetic grains.

The anisotropy coefficient, Ku, of grains in the recording medium includes a crystalline anisotropy contribution and a shape anisotropy contribution. Crystalline anisotropy was described above. Shape anisotropy is due to the shape of the grain, as follows. A magnetized body produces magnetic charges, or poles, at its surface. This surface charge distribution, acting in isolation, is itself another source of a magnetic field, called the demagnetizing field. This field is called the demagnetizing field because it acts in opposition to the magnetization that produces it. For a long, thin grain, the demagnetizing field will be less if the magnetization is along the long axis than if it is along one of the short axes. This produces an easy axis of magnetization along the long axis. A sphere, on the other hand, has no shape anisotropy. The magnitude of shape anisotropy is dependent on the saturation magnetization.

In the embodiments described herein, the concept of a "switching unit" is used. A switching unit is a magnetic volume that undergoes collective dynamic switching. That is, the grains of the switching unit switch together in response to an applied magnetic field. In the write process, the switching unit is larger than a single grain, e.g., the switching unit may be a bit cell.

The anisotropy to achieve thermal stability (Ku_decay) of a magnetic grain is defined as $$Ku\_decay = Ku\_crystalline + Ku\_shape\_grain,$$

where Ku_crystalline is crystalline anisotropy, Ku_shape_grain is shape anisotropy.

The anisotropy for the write process (Ku_dynamic_coercivity) is defined as $$Ku\_dynamic\_coercivity = Ku\_crystalline + Ku\_shape\_bit\_cell,$$

where Ku_shape_bit_cell is the anisotropy of the bit cell (or, more generally, switching unit).

To improve thermal stability, high aspect ratio magnetic grains (e.g., cylinders or other elongated shape) may be used. The thermal stability improvement scales as $(4\pi M_s^2)$ ·(shape_factor), where "shape_factor" approaches one for a very long cylinder and zero for a sphere. For example, by selecting $4\pi M_s \sim Hk$, Eb can effectively be doubled. This can be achieved while not increasing the required write field significantly.

As the shape anisotropy of the magnetic grains increases, a corresponding increase in media coercivity is expected. The increase in media coercivity will require higher write fields to effect changes in magnetization. This is the essence of the superparamagnetic limit. In order to overcome this, the dynamic coercivity of switching units in the recording medium may be reduced. For a given spacing between grain cylinders, the switching unit shape anisotropy contribution to dynamic coercivity can be varied, even cancelled. This leads to a system with controlled, e.g., reduced, dynamic coercivity.

In addition to the foregoing, lowering/optimizing the packing fraction reduces the media demagnetizing field. This reduces intragranular magneto-static coupling.

The recording medium improvements described herein can be expressed as follows:

$$Ku\_decay/Ku\_dynamic\_coercivity = (Ku\_crystalline + Ku\_shape\_grain)/(Ku\_crystalline + Ku\_shape\_bit\_cell)$$

Selecting a recording medium with a large $$Ku\_shape\_grain/Ku\_crystalline \sim 4\pi M/Hk,$$

and a medium with a small $$Ku\_shape\_bit\_cell/Ku\_crystalline,$$

will lead improvements in thermal stability.

A ratio of Ku_shape_grain/Ku_crystalline that is larger than three (3) may be obtained by reducing the diameter of the magnetic grains by 20%–30%.

Referring to FIG. 1, a write head 20 applies a magnetic "head" write field 10 to recording medium 40. In this embodiment, recording medium 40 is a perpendicular recording medium, such as a thin film media having crystallite magnetic grains of cobalt and platinum. Write field 10 is applied to switch the magnetization of region 30 from an upward-pointed magnetization (indicated by upward arrows "↑") to a downward-pointed magnetization (indicated by downward arrows "↓"). Switching of region 30 occurs in response to rapid switching of the write field applied by write head 20 from "up" to "down". "Rapid switching", in this example, may mean switching the magnetic field at a period of 0.15 ns or less.

Figure 2:
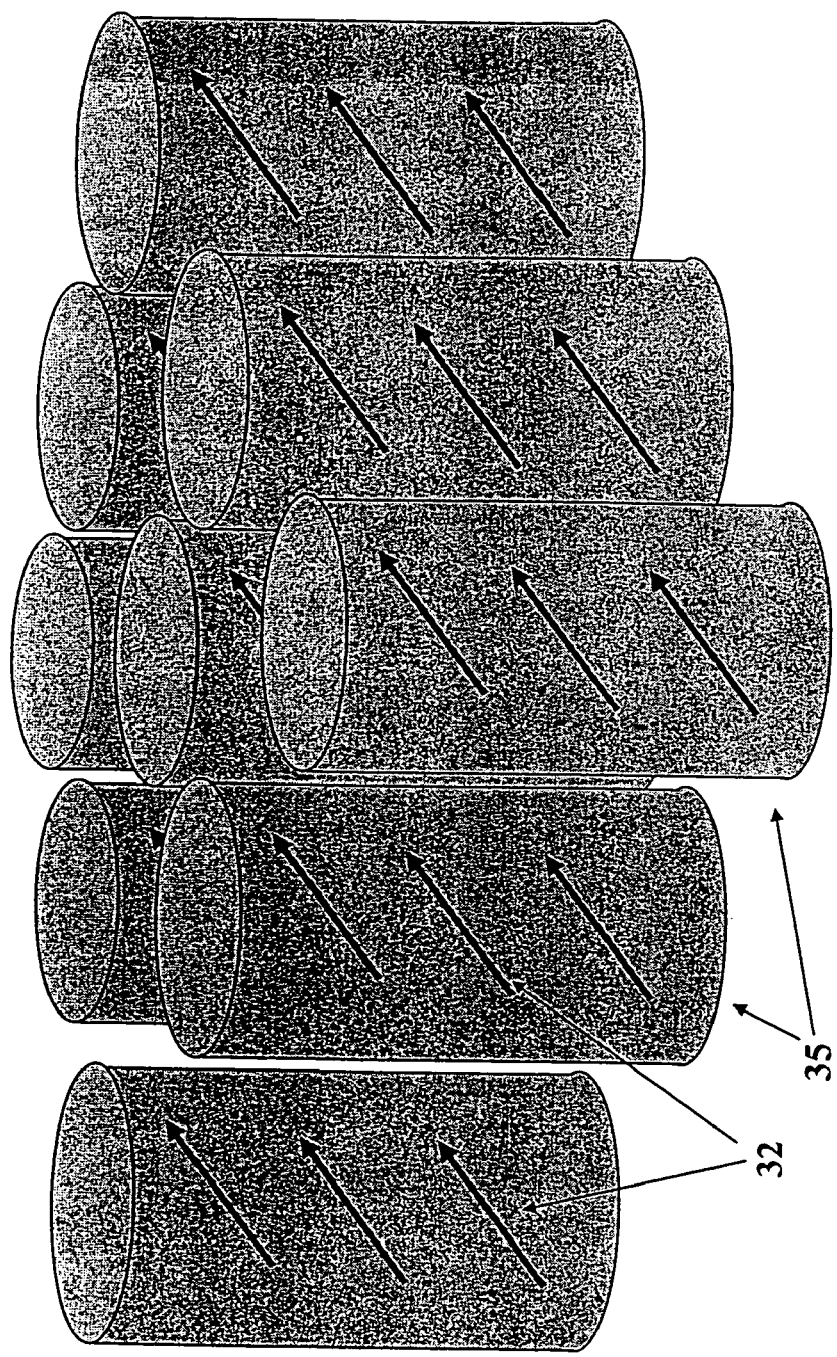
FIG. 2 is a perspective view of a region of the magnetic recording medium that is switched in response to sudden switching of a write head magnetic field.

The high switching gradient of the write field 10 forms a sharp transition boundary 50 between a newly-switched region 30 and a previously-switched region 60 (to the right of region 30). Also, rapid switching of write field 10 causes grains 35 (see FIG. 2) in switching region 30 to precess around their vertical axes in synchronism.

Figure 3:
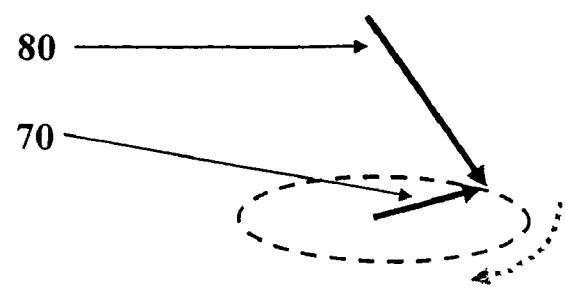
FIG. 3 shows a growing horizontal component of a collective magneto-static field of magnetic grains in the region of the recording medium, which is produced by rapidly switching the write field.
Figure 4:
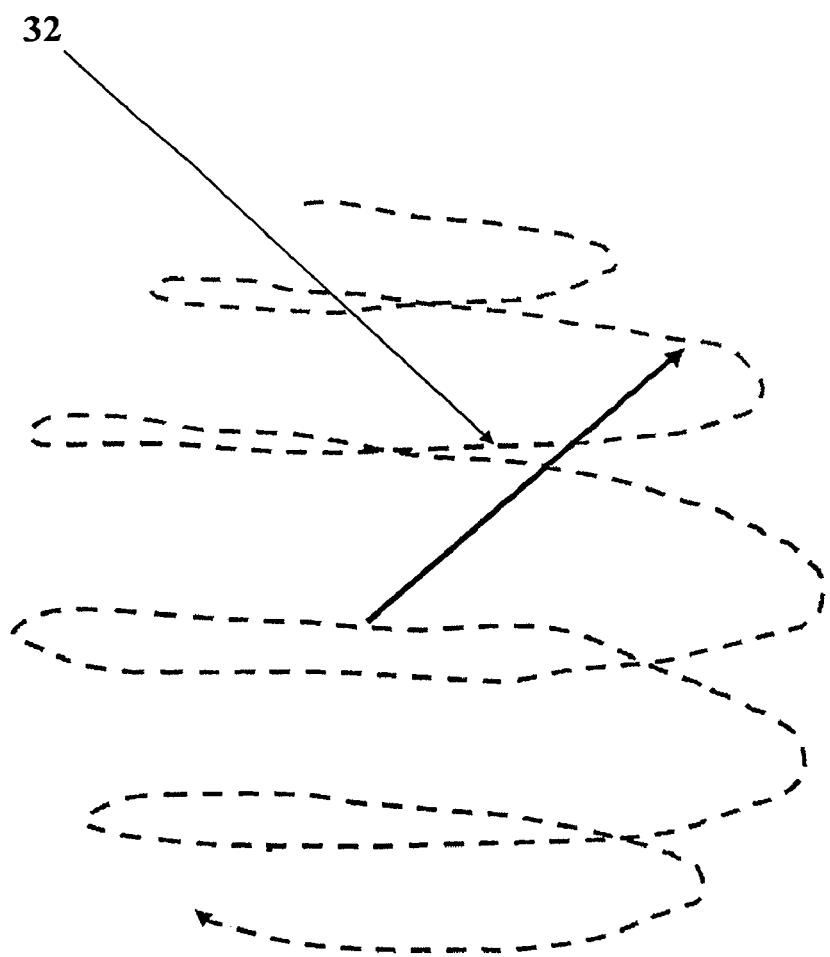
FIG. 4 is a diagram showing the precessional "corkscrew" trajectory of a magnetic grain, which occurs in response to the write head magnetic field.

FIG. 3 shows a growing horizontal component 70 of the collective magneto-static field 80 of magnetic grains 35 in region 30, which is produced by rapidly switching the write field. Magneto-static field 80 is collective in the sense that it is the combined magneto-static field of grains 35 in region 30. The growing horizontal component 70 enhances the ability of write field 10 to drive the spiraling magnetization 32 of grains 35 (see FIG. 4) past horizontal magnetization. The switching process can then complete itself even if the write field 10 is removed.

Figure 5:
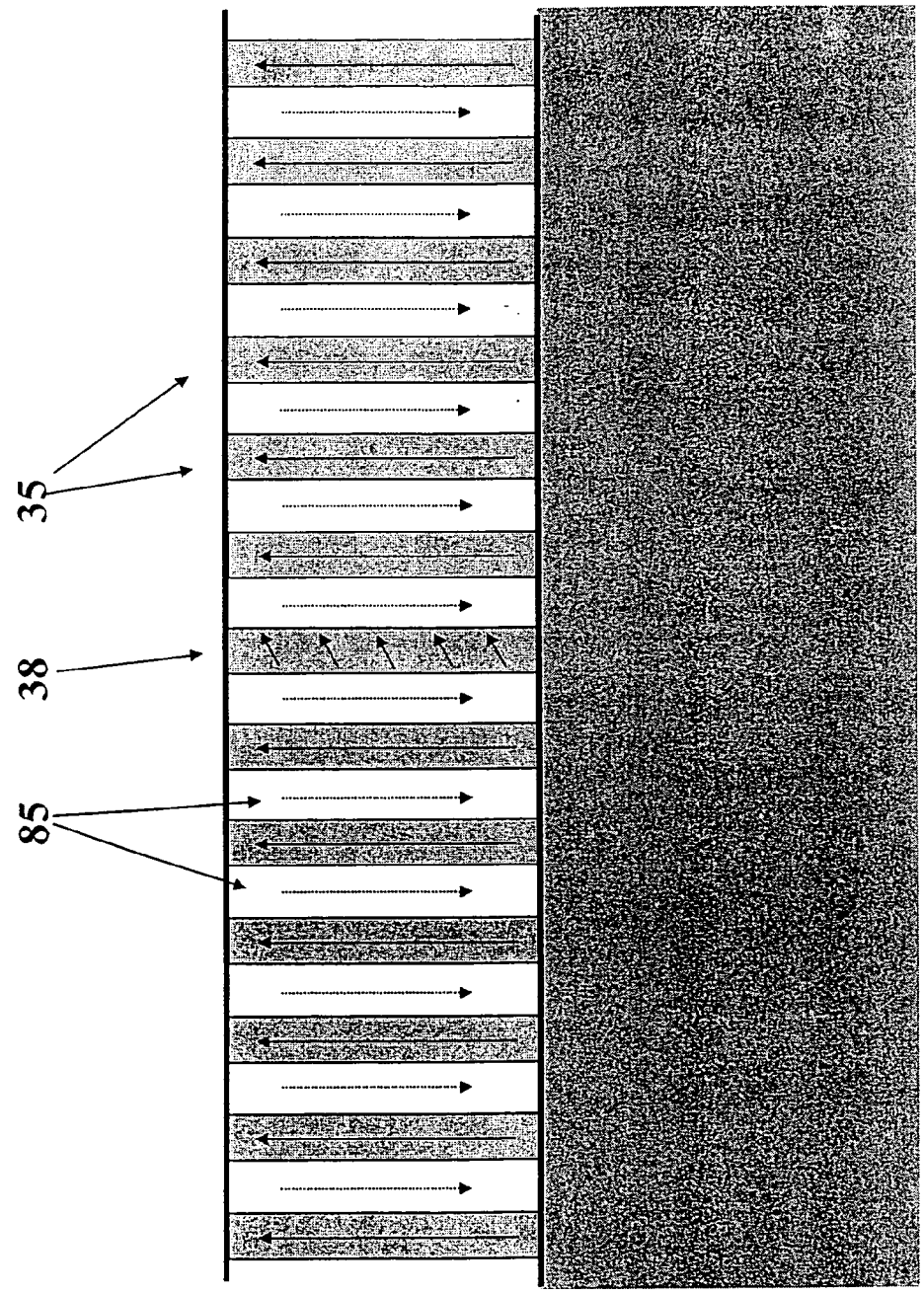
FIG. 5 is a magnified side view of the magnetic recording medium showing a single magnetic grain being driven towards switching by thermal agitation.

Referring to FIG. 5, the collective horizontal magneto-static field 80 (of grains 35) increases for a high magnetization density. However, the vertical component 85 of the magnetic field also increases as a result of this condition. This vertical component 85 reduces the energy barrier (Eb) of a thermally-excited grain 38 which reduces thermal stability of the grains, leading to data degradation over time. In order to reduce field 85, the packing fraction may be made relatively low. As described below, a packing fraction may be used which enhances collective switching in response to write field 10, while increasing the stability of individual grains against thermally-induced switching.

In one embodiment, the packing fraction may be less than 64%, e.g., 60%, 50%, etc. In this embodiment, the saturation magnetization of the magnetic grain cores may be about 700 emu/cc; the crystalline anisotropy field strength of the grains may be about 7 kOe; and the average ratio of media thickness to grain diameter may be on the order of 4 (assuming a cylindrical grain). This set of parameters can be achieved if the media grains are comprised of an alloy that includes cobalt, platinum and chrome, where the magnetic grain boundaries include an oxide of silicon.

With a magnetic field −80% to +80% switching time of 0.1 ns or less, write head field 10 at angle of 10° (or more) to the normal to the medium, the write field strength should be greater than ~8.5 kOe to switch the grains of recording medium 40 collectively. If the thickness of recording medium 40 is 20 nm, the switching energy barrier (Eb) of an individual grain can be determined using a vertical collective demagnetizing field 85 of ~0.4 KOe and a shape anisotropy field of ~3 kOe for a cylinder with the geometry described above (assuming a hexagonal grain array for simplicity). With this choice of system parameters, the energy barrier (Eb) to thermal switching of individual grains is determined to be 173 kT at a room temperature (292° K or 20° C. (C)).

Figure 6:
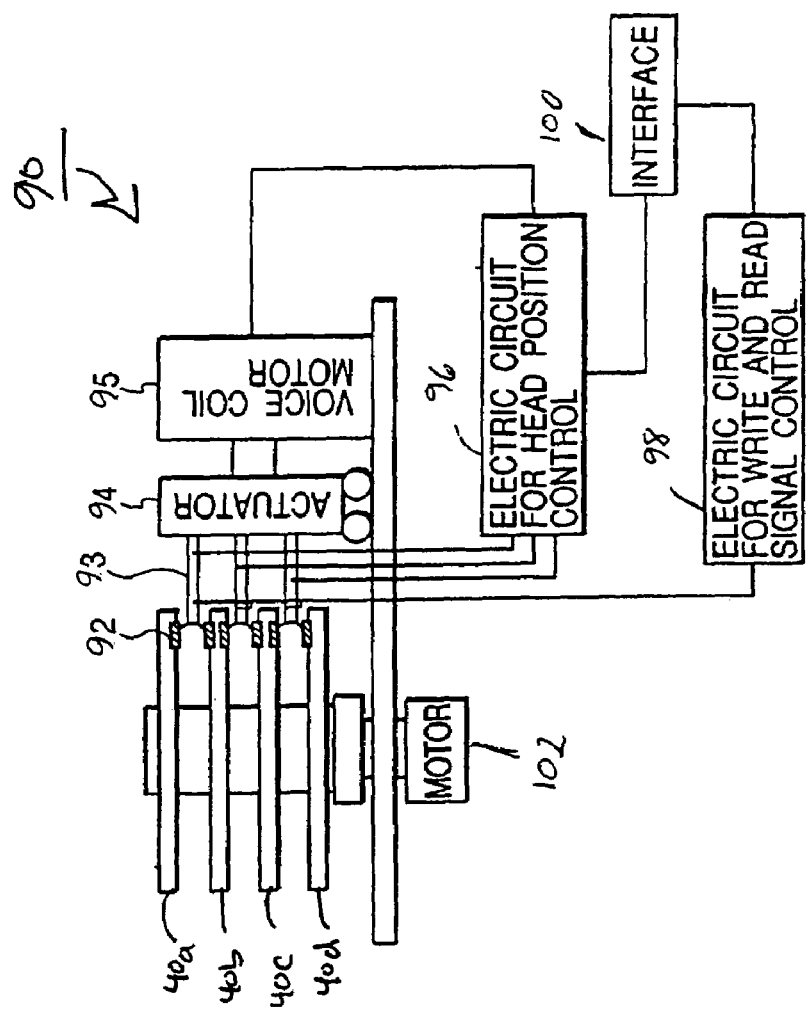
FIG. 6 is a block diagram of a magnetic recording system that may include the shielded pole magnetic write head and granular magnetic recording medium of claim 1.

FIG. 6 shows an embodiment of a magnetic disk drive system 90, which includes one or more magnetic recording media having the characteristics described herein. Included in system 90 are the following components: a read/write magnetic head 92 such as head 20 (opposing to each magnetic recording medium 40a–40d), which reads magnetic data from, and writes magnetic data to, the magnetic recording medium; a suspension 93 to hold magnetic head 92; an actuator 94; a voice coil motor 95 to drive actuator 94; a head positioning circuit 96 which positions the read/write magnetic head relative to the magnetic recording medium; a recording/reproducing circuit 98; an interface circuit 100; and a motor 102.

Electrical signals from each magnetic head 92 are introduced to the recording/reproducing circuit 98. Electrical signals to and from the magnetic recording medium pass through the interface circuit 100. The magnetic recording medium 30 driven by the motor 102.

The invention described herein has been described in the context of a perpendicular recording medium; however, it is not limited as such. The improvements of the invention may be incorporated into longitudinal recording systems. Longitudinal recording systems record information in a direction that is longitudinal to the plane of the recording medium. The recording head may be a shielded pole head or any other type of recording head used in magnetic recording systems.

Although the foregoing has been described in terms of a hard disk, the invention can be used in conjunction with any type of magnetic recording media, including, but not limited to, magnetic tape. Furthermore, although the foregoing has been described with respect to cylindrically-shaped grains, any type of elongated or other shaped grain may be used.

In this regard, it is understood by those skilled in the art that there are other suitable system configurations which can achieve significant thermal stability gains by exploiting the synchronized collective switching mode described herein with a judicious choice of packing fraction, grain diameter, media thickness, magnetization density, and crystalline anisotropy field.

Other embodiments not described herein are also within the scope of the following claims.

What is claimed is:

1. A magnetic recording system comprising:
    a recording medium having a packing fraction of less than 64%; and
    a write head which applies a magnetic field to the recording medium, the magnetic field switching at a rate of 0.15 ns or less.

2. The magnetic recording system of claim 1, wherein the recording medium is a perpendicular recording medium.

3. The magnetic recording system of claim 1, wherein the recording medium comprises a soft underlayer.

4. The magnetic recording system of claim 1, wherein the recording medium is comprised of magnetic grains having a substantially elongated shape.

5. The magnetic recording system of claim 4, wherein a ratio of a thickness of the recording medium to a diameter of individual magnetic grains is greater than one.

6. The magnetic recording system of claim 1, wherein the packing fraction is less than 60%.

7. The magnetic recording system of claim 6, wherein the packing fraction is less than 50%.

8. The magnetic recording system of claim 1, wherein the write head applies the magnetic field at an angle relative to the recording medium.

9. The magnetic recording system of claim 8, wherein the angle is 10° or more relative to a normal to the recording medium.

10. The magnetic recording system of claim 1, wherein a self-magnetization field of magnetic grains in the recording medium is at least 75% of an anisotropy field of the grains.

11. The magnetic recording system of claim 1, wherein the recording medium includes at least one of cobalt and platinum.

12. The magnetic recording system of claim 1, wherein the recording medium has a high magnetization density.

13. The magnetic recording system of claim 1, wherein the recording medium is a longitudinal recording medium.

14. The magnetic recording system of claim 1, wherein the packing fraction is less than 50%, a saturation magnetization of magnetic grains in the recording medium is about 700 emu/cc, a crystalline anisotropy field strength of the recording medium is about 7 kOe, and an average ratio of a thickness of the recording medium to a diameter of the magnetic grains is about 4.

15. A magnetic recording system comprising:
    a recording medium with a magnetic layer comprised of magnetic grains, the magnetic recording medium having a packing fraction of less than one; and
    a read/write magnetic head which provides a magnetic field to switch a plurality of magnetic grains in a switching unit collectively in synchronism.

16. The magnetic recording system of claim 15, wherein the packing fraction of less than one impedes individual thermal switching of the grains.

17. The magnetic recording system of claim 15, wherein the recording medium is a perpendicular recording medium.

18. The magnetic recording system of claim 15, wherein the recording medium comprises a soft underlayer.

19. The magnetic recording system of claim 15, wherein the magnetic grains have a substantially elongated shape.

20. The magnetic recording system of claim 15, wherein a ratio of a thickness of the recording medium to a diameter of individual magnetic grains is greater than one.

21. The magnetic recording system of claim 15, wherein the packing fraction is less than 60%.

22. The magnetic recording system of claim 21, wherein the packing fraction is less than 50%.

23. The magnetic recording system of claim 15, wherein the read/write magnetic head applies the magnetic field at an angle relative to the recording medium.

24. The magnetic recording system of claim 23, wherein the angle is 10° or more relative to a normal to the recording medium.

25. The magnetic recording system of claim 15, wherein a self-magnetization field of magnetic grains in the recording medium is at least 75% of an anisotropy field of the grains.

26. The magnetic recording system of claim 15, wherein the recording medium includes at least one of cobalt and platinum.

27. The magnetic recording system of claim 15, wherein the recording medium has a high magnetization density.

28. The magnetic recording system of claim 15, wherein the recording medium is a longitudinal recording medium.

29. The magnetic recording system of claim 15, further comprising a head positioning circuit which positions the read/write magnetic head relative to the magnetic recording medium.

30. The magnetic recording system of claim 15, wherein the read/write magnetic head comprises a shielded pole recording head.

31. The magnetic recording system of claim 15, wherein the switching rise time of the magnetic field is less than the gyromagnetic precession period of the magnetic grains.

32. A magnetic recording system comprising:
    a recording medium with a magnetic layer comprised of magnetic grains, the magnetic recording medium having a packing fraction of less than one; and
    a magnetic head which provides a magnetic field to switch a plurality of magnetic grains in a switching unit collectively, the magnetic field causing the magnetic grains in the switching unit to precess in synchronism.

33. The magnetic recording system of claim 32, wherein the switching rise time of the magnetic field is less than the gyromagnetic precession period of the magnetic grains.

34. The magnetic recording system of claim 32, wherein the recording medium is a perpendicular recording medium.

35. The magnetic recording system of claim 32, wherein a ratio of a thickness of the recording medium to a diameter of individual magnetic grains is greater than one.

36. The magnetic recording system of claim 32, wherein the packing fraction is less than 60%.

37. The magnetic recording system of claim 32, wherein the magnetic grains in the switching unit precess around their vertical axes in synchronism.

* * * * *